United States Patent
Kopikare et al.

(10) Patent No.: US 8,892,722 B1
(45) Date of Patent: Nov. 18, 2014

(54) PEER-TO-PEER DISCOVERY SYSTEMS AND METHODS

(75) Inventors: Milind Kopikare, San Jose, CA (US); Sarang Shrikrishna Wagholikar, Sunnyvale, CA (US); Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 871 days.

(21) Appl. No.: 12/793,850

(22) Filed: Jun. 4, 2010

Related U.S. Application Data (60) Provisional application No. 61/219,288, filed on Jun. 22, 2009.

(51) Int. Cl.
G06F 15/173 (2006.01)
H04L 29/06 (2006.01)

(52) U.S. Cl.
CPC .......... *G06F 15/173* (2013.01); *H04L 65/1066* (2013.01)
USPC ......... 709/224; 455/552.1; 455/464; 370/329

(58) Field of Classification Search
USPC ................. 709/224; 455/552.1, 464; 370/329
See application file for complete search history.

(56) References Cited

U.S. PATENT DOCUMENTS

| | | | | |
|---|---|---|---|---|
| 5,392,276 | A * | 2/1995 | Tran | 370/294 |
| 5,404,355 | A * | 4/1995 | Raith | 370/311 |
| 6,243,573 | B1 * | 6/2001 | Jacklin | 455/416 |
| 6,292,494 | B1 * | 9/2001 | Baker et al. | 370/459 |
| 6,526,039 | B1 * | 2/2003 | Dahlman et al. | 370/350 |
| 6,725,281 | B1 * | 4/2004 | Zintel et al. | 719/318 |
| 6,775,261 | B1 * | 8/2004 | Banister | 370/344 |
| 6,952,181 | B2 * | 10/2005 | Karr et al. | 342/457 |
| 7,460,527 | B2 * | 12/2008 | Ghosh et al. | 370/360 |
| 7,805,498 | B2 * | 9/2010 | Elnozahy et al. | 709/217 |
| 7,865,196 | B2 * | 1/2011 | Stahl et al. | 455/464 |
| 2005/0094592 | A1 * | 5/2005 | Schmidt | 370/328 |
| 2005/0262241 | A1 * | 11/2005 | Gubbi et al. | 709/225 |
| 2005/0266879 | A1 * | 12/2005 | Spaur et al. | 455/556.2 |
| 2006/0121916 | A1 * | 6/2006 | Aborn et al. | 455/456.5 |
| 2006/0166699 | A1 * | 7/2006 | Aghvami et al. | 455/552.1 |
| 2006/0258383 | A1 * | 11/2006 | Jiang et al. | 455/502 |

(Continued)

FOREIGN PATENT DOCUMENTS

| | | |
|---|---|---|
| EP | 1318687 | 6/2003 |
| WO | WO 2004/075583 | 9/2004 |
| WO | WO 2006/033443 | 3/2006 |

OTHER PUBLICATIONS

Xiao et al., "Emerging Wireless LANs, Wirelss PANs, and Wireless MANs", 2009.*

(Continued)

*Primary Examiner* — O. C. Vostal (57) ABSTRACT

A discovery control system of a first device includes a mode selection module. The module selection module is configured to select a listen mode and a search mode. A discovery control module includes a probe request module. The probe request module is configured to generate a probe request signal within the first device and receive a probe response signal generated by a second device during the search mode. A probe response module is configured to generate a probe response signal within the first device during the listen mode and the search mode and based on a probe request signal generated by the second device.

25 Claims, 7 Drawing Sheets

(56) References Cited

U.S. PATENT DOCUMENTS

| | | | |
|---|---|---|---|
| 2007/0171910 A1* | 7/2007 | Kumar | 370/392 |
| 2007/0189249 A1* | 8/2007 | Gurevich et al. | 370/338 |
| 2007/0190938 A1* | 8/2007 | Hillyard | 455/41.1 |
| 2007/0192414 A1* | 8/2007 | Chen et al. | 709/205 |
| 2007/0213012 A1* | 9/2007 | Marin et al. | 455/63.3 |
| 2007/0242645 A1 | 10/2007 | Stephenson et al. | |
| 2007/0263595 A1* | 11/2007 | Charrat | 370/351 |
| 2007/0286136 A1* | 12/2007 | Rittle et al. | 370/338 |
| 2008/0095075 A1* | 4/2008 | Monier | 370/257 |
| 2008/0095091 A1 | 4/2008 | Surineni et al. | |
| 2008/0112334 A1* | 5/2008 | Laroia et al. | 370/254 |
| 2008/0148379 A1* | 6/2008 | Xu et al. | 726/11 |
| 2009/0016231 A1* | 1/2009 | Li et al. | 370/252 |
| 2009/0019061 A1* | 1/2009 | Scannell, Jr. | 707/10 |
| 2009/0019150 A1* | 1/2009 | Li et al. | 709/224 |
| 2009/0019165 A1* | 1/2009 | Li et al. | 709/227 |
| 2009/0034443 A1 | 2/2009 | Walker et al. | |
| 2009/0092101 A1* | 4/2009 | Busch et al. | 370/332 |
| 2009/0125945 A1* | 5/2009 | Lee et al. | 725/46 |
| 2009/0239497 A1* | 9/2009 | Sennett et al. | 455/404.1 |
| 2010/0031143 A1* | 2/2010 | Rao et al. | 715/261 |
| 2010/0177712 A1* | 7/2010 | Kneckt et al. | 370/329 |
| 2010/0178868 A1* | 7/2010 | Charrat | 455/41.1 |
| 2010/0304782 A1* | 12/2010 | Chang et al. | 455/552.1 |
| 2012/0040615 A1* | 2/2012 | Auriffeille et al. | 455/41.2 |

OTHER PUBLICATIONS

Chiu et al., "On Optimization of Joint Channel Assignment and Routing in Mobile Ad Hoc Networks", 2007.*

Cellular Networking Perspectives Ltd., "TDMA Digital Cellular and PCS", 2004.*

Yacoub, "Wireless Technology: Protocols, Standards, and Techniques", 2002.*

U.S. Appl. No. 12/499,937, filed Jul. 2009, Banerjea et al.

U.S. Appl. No. 11/923,347, filed Oct. 2007, Chhabra et al.

Fashandi, S. "Real-Time Handoff in Solar/Battery Powered ESS Mesh Networks." Personal, Indoor and Mobile Radio Communications 3 (Sep. 11, 2005): pp. 1489-1494.

Kohvakka et al. "PC/104 Based Wireless Diagnosis Module" IECON-2002. Proceedings of the 28th Annual Conference of the IEEE Industrial Electronics Society. Sevilla, Spain, Nov. 5-8, 2002; vol. 3, Nov. 5, 2002. pp. 2351-2356.

Sangkyu, Baek. "Performance Analysis of Power Save Mode in IEEE 802.11 Infrastructure WLAN." Telecommunications (Jun. 16, 2008): pp. 1-4.

The International Search Report and the Written Opinion of the International Searching Authority, or the Declaration mailed Nov. 4, 2009 for International Application No. PCT/US2009/050058 filed Sep. 7, 2009; 15 pages.

The International Search Report and the Written Opinion of the International Searching Authority, or the Declaration mailed Oct. 28, 2009 for International Application No. PCT/US2009/050068 filed Jul. 9, 2009; 16 pages.

"Privacy-Preserving 802.11 Access Point Discovery"; Janne Lindqvist et al.; Mar. 16-18, 2009; Zurich, Switzerland; 8 pages.

"Wi-Fi Protected Setup Specification", Version 1.0h; Wi-Fi Alliance™; Dec. 2006; 110 pages.

Wi-Fi Certified™ for Wi-Fi Protected Setup™: Easing the User Experience for Home and Small Office Wi-Fi® Networks; ©2007, 2008, 2009, Wi-Fi Alliance; 14 pages.

Peer-to-Peer Technical Task Group; Peer-to-Peer Technical Specification; Revision 1.0; May 12, 2009; 105 pages.

IEEE Std 802.11b-1999/Cor 1-2001 (Corrigendum to IEEE Std 802.11b-1999); IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 2: Higher-speed Physical Layer (PHY) extension in the 2.4 GHz band-Corrigendum 1; IEEE Computer Society; Sponsored by the LAN/MAN Standards Committee; Nov. 7, 2001; 23 pages.

IEEE P802.11g/D8.2, Apr. 2003 (Supplemental to ANSI/IEEE Std 802.11 1999 (Reaff 2003)); Draft Supplement to Standard [for] Information Technology—Telecommunications and information exchange between systems—Local and metropolitan area networks—Specific requirements; Part 11: Wireless LAN Medium Access Control (MAC) and Physical Layer (PHY) specifications; Further Higher Data Rate Extension in the 2.4 GHz Band; Sponsored by the LAN/MAN Standards Committee of the IEEE Computer Society; 69 pages.

IEEE 802.16 2004 (Revision of IEEE Std 802.16-2001); IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; Oct. 1, 2004; 893 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications; High-speed Physical Layer in the 5 GHz band; Adopted by the ISO/IEC and redesignated as ISO/IEC 8802-11:1999/Amd 1:2000(E); Sponsor LAN/MAN Standards Committee of the IEEE Computer Society; 91 pages.

S.A. Mujtaba, "IEEE P802.11—Wireless LANS, TGn Sync Proposal Technical Specification," The Institute of Electrical and Electronics Engineers, Inc., doc.: IEEE 802.11-04/0889r6, May 18, 2005; 131 pages.

International Standard ISO/IEC 8802-11; ANSI/IEEE Std 802.11; First edition 1999-00-00; Information technology—Telecommunications and information exchange between systems—Local and metropolitan area networks—Specific requirements; Part 11: Wireless LAN Medium Access Control (MAC) and Physical Layer (PHY) specifications; Aug. 20, 1999; 531 pages.

* cited by examiner

PEER-TO-PEER DISCOVERY SYSTEMS AND METHODS

CROSS-REFERENCE TO RELATED APPLICATIONS

This disclosure claims the benefit of U.S. Provisional Application No. 61/219,288, filed on Jun. 22, 2009. The disclosure of the above application is incorporated herein by reference in its entirety.

FIELD

The present disclosure relates to discovery between peer-to-peer devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) typically permits wireless communication between multiple network devices. A WLAN can be operated in a number of different modes including, for example, an "ad hoc mode". In a wireless network that operates according to the ad hoc mode (referred to herein as a peer-to-peer (P2P) network), network devices communicate directly with each other rather than through a central base station (or access point).

A peer device can discover other peer devices within a P2P network by (i) passively listening for beacons or probe requests (also referred to as "probe frames") or (ii) actively searching for other peer devices by sending probe requests. A peer device can respond to a probe request with a probe response (also referred to as a "response frame").

SUMMARY

A discovery control system of a first device is provided and includes a mode selection module. The module selection module is configured to select a listen mode and a search mode. A discovery control module includes a probe request module. The probe request module is configured to generate a probe request signal within the first device and receive a probe response signal generated by a second device during the search mode. A probe response module is configured to generate a probe response signal within the first device during the listen mode and the search mode and based on a probe request signal generated by the second device.

In still other features, the apparatus described above is implemented by a computer program executed by one or more processors. The computer program can reside on a computer-readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, a peer device may refer to a mobile device, a mesh point, a service request device (SRD), user equipment (UE), a network device, and/or a mobile node. A peer device can include equipment of an end user, such as a processor, a radio interface adaptor, etc. A peer device can include a mobile network device, a television, a mobile phone, a personal data assistant (PDA), a computer, etc.

A peer device may refer to and/or include a control module, a transceiver, a protocol stack of a transceiver and/or communication layers, such as a physical (PHY) layer, a media access control (MAC) layer, a radio link control (RLC) layer, a packet data convergence protocol (PDCP) layer, a radio resource control (RRC) layer, etc. Although a particular number of each peer device is shown, any number of each peer device may be included in a network. Each of the peer devices may be considered as a remote network device relative to another peer device.

In addition, in the following description a probe (discovery) request signal may be associated with asynchronous communication and include a service set identifier (SSID) or a basic SSID (BSSID), Internet protocol (IP) address, characteristic bits, capability bits, information request bits, etc. of a host device. A service set identifier (SSID) is a sequence of characters that uniquely names a wireless local area network. The characteristic bits may indicate characteristics of a device, such as data rates, frequencies or channels of operation, etc. The capability bits may indicate capabilities of a device, such as Internet access capability, printing capability, half duplex and/or full duplex mode capability, and communication protocol and application capabilities. The information request bits may identify information requested by the mobile device that transmits the probe request. The information request bits may, for example, be used to request characteristics and capabilities of peer devices.

Furthermore, in the following description, a probe response signal may include a BSSID, time synchronization bits, characteristic bits, capability bits, information request bits, data (i.e., user) bits, etc. of a peer device that responds to a probe request. The beacon response signal and the probe response signal may be generated by a mobile device that respectively receives a beacon signal or a probe request. The probe requests and probe responses may satisfy standards of IEEE 802.11.

Device discovery of peer devices within a peer-to-peer (P2P) network includes a first peer device operating in a "listen" mode or in a "search" mode. During the listen mode, the first peer device listens for and may receive probe requests from other peer devices. The first peer device may respond to the probe requests by sending probe responses. During the search mode, the first peer device transmits probe requests. Other peer devices may respond to the probe requests by transmitting probe responses to the first peer device. A peer device may alternate between the listen and search modes until other peer devices are discovered.

Traditionally, a peer device operates as an access point during the listen mode, and operates as a P2P station or client searching for an access point during the search mode. The peer device may operate in the listen and search modes without timing coordination with other peer devices. In addition, during periods of device discovery, the peer device may operate on a different channel than other peer devices. As a result, discovery time (i.e., time for the first peer device to discover a second peer device) may vary.

MN The peer devices may not discover each other if the peer devices communicate on different channels and/or the listen and search modes of the peer devices are synchronized. The listen and search modes are synchronized when the peer devices are operating in respective listen modes during the same period and are operating in respective search modes during the same period. Put another way, the peer devices are synchronized when the first peer device is not operating in a listen mode when the second peer device is operating in a search mode and vice versa.

As an example, a first peer device may operate on a first channel and in a search mode during a discovery period. A second peer device may operate on a second channel and in a search mode during the same discovery period. If the first channel is different than the second channel the peer devices may not receive signals from each other. Also, the peer devices may not receive probe request signals from each other, as each of the peer devices are operating in a search mode. Peer devices do not detect and/or respond to probe request signals while operating in a search mode. The peer devices do not generate probe response signals since the probe request signals are not detected. As a result, discovery of a peer device can be delayed and/or may not occur.

A search mode may have a corresponding predetermined period (e.g., 100 ms). The search mode may be, for example, as much as ⅓ (33%) a duration of a listen mode. In other words, 33% of the time, a P2P device may not be discoverable. As a result, discovery time associated with using the above-described search modes may be 33% longer than discovery times associated with other discovery techniques disclosed below. Example discovery techniques are described below that permit a P2P device to be discovered 100% of the time.

P2P devices and discovery methods are disclosed in the following description. In addition to the discovery methods described herein, the P2P devices may perform procedures and/or satisfy standards described in "Peer-to-Peer Technical Specification", Revision 1.0, provided and/or submitted to the Wi-Fi Alliance and WFA Peer-to-Peer Technical Task Group and dated May 12, 2009. Also, various probe request and probe response signals are described, which may satisfy respective formats disclosed in the Peer-to-Peer Technical Specification.

Figure 1:
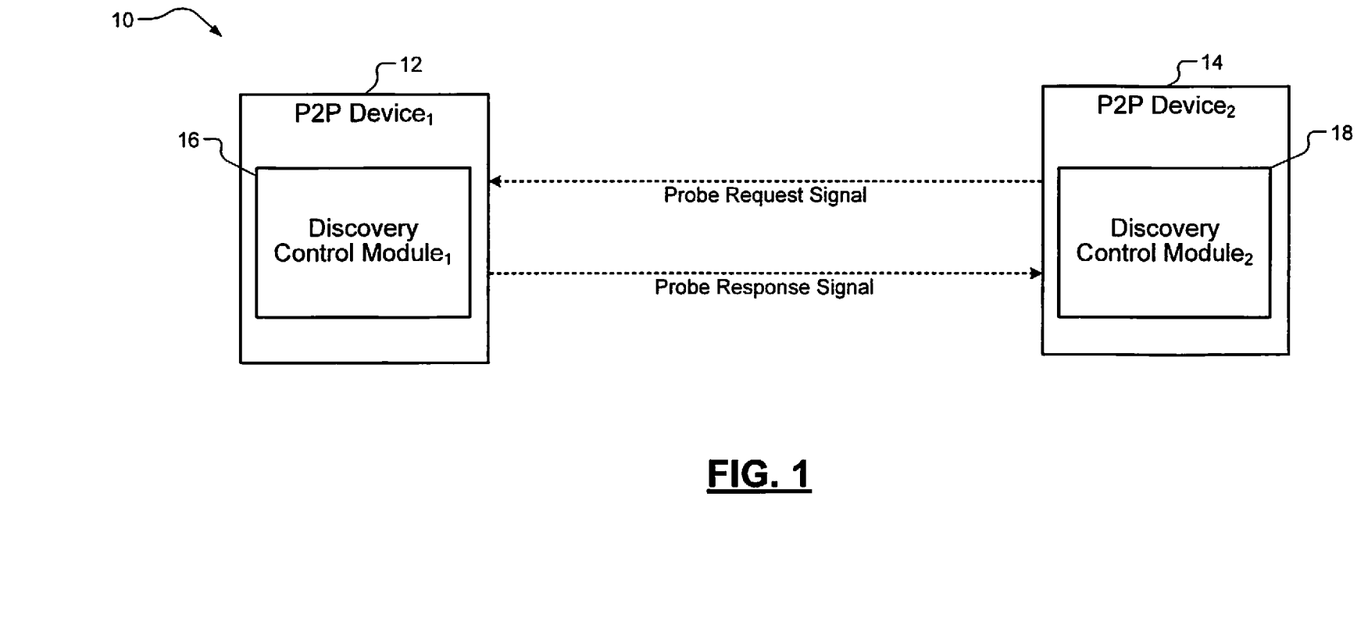
FIG. 1 is a peer-to-peer (P2P) network illustrating probe request and response signal transmission between P2P devices configured in accordance with the present disclosure.

In FIG. 1, a P2P network 10 is shown. The P2P network 10 includes peer devices 12, 14 that each operate in active and/or passive modes (collectively discovery mode) and/or sleep modes, collectively referred to as operating modes. The active modes include listen and search modes. The peer devices 12, 14 listen for probe request signals and generate probe response signals during the listen modes. The peer devices 12, 14 generate and listen for probe request signals during the search modes. Each of the peer devices 12, 14 may generate, transmit and receive probe requests and probe responses during the search mode. The passive modes include passive scanning of channels to receive beacons and/or broadcast signals. The beacons and/or broadcast signals may include SSIDs and other peer device and/or P2P network information. The sleep modes include depowering of one or more modules and/or devices of the peer devices to conserve power.

The peer devices 12, 14 respectively include discovery control modules 16, 18. The discovery control modules 16, 18 control discovery of peer devices. The discovery control modules 16, 18 may select and switch between operating modes and/or operate in multiple operating modes during the same period of time (multi-mode operation). For example, the first discovery control module 16 may operate in the listen and search modes during the same period of time. The first discovery control module 16 may listen for probe request signals (listen mode) while operating in the search mode and/or while generating probe request signals. This allows the first discovery control module 16 to discover the second discovery control module 18 100% of the time.

Figure 2:
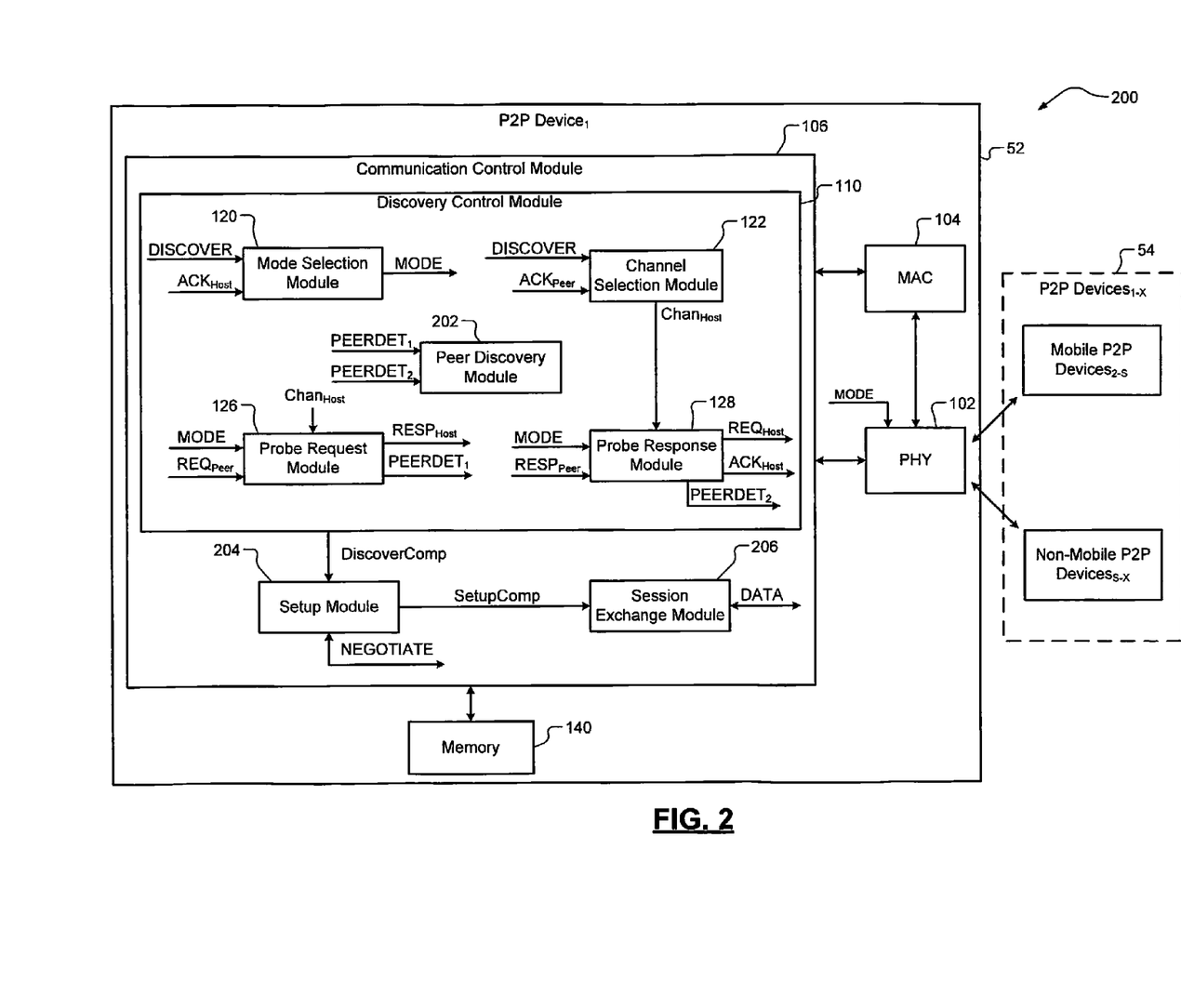
FIG. 2 is a functional block diagram of a portion of another P2P network illustrating a P2P device configured in accordance with the present disclosure.

In FIG. 2, a first portion 50 of a P2P network is shown. The P2P network includes a first P2P device 52 and other P2P devices 54 (P2P devices$_{2-X}$). The first P2P device 52 may be a non-mobile device or a mobile device, as shown. The P2P devices 54 include mobile devices$_{2-S}$ and non-mobile devices$_{S-X}$. S is the number of mobile devices and is greater than or equal to 1. X is the total number of P2P devices in the P2P network 50 and is greater than or equal to 2.

The P2P devices$_{1-X}$ may operate in active or passive scanning modes and discover and communicate directly and wirelessly with each other. Each of the P2P devices$_{1-X}$ may operate as a host and transmit and/or listen for probe request signals to detect and identify other P2P devices. The other P2P devices may be detected within a predetermined distance of the host device. Each of the P2P devices$_{1-X}$ operates in a half-duplex mode and/or a full-duplex mode.

The P2P devices$_{1-X}$ may perform as one or more of the P2P devices 12, 14 of FIG. 1. The P2P devices$_{1-X}$ may communicate using wireless protocols, such as Wi-Fi network protocols, wireless local area network (WLAN) protocols, IEEE 802.11 wireless network protocols, etc.

The first P2P device 52 includes a physical layer (PHY) device 102, a media access controller (MAC) 104, a communication control module 106, and a power management module 108. The P2P devices 54 may each include the same or similar elements as the first P2P device 52. The PHY device 102 interfaces the first P2P device 52 with the P2P devices 52. For example, the PHY device 102 transmits or receives beacon signals (i.e., beacons), probe request signals, beacon response signals and/or probe response signals to and from the P2P devices$_{2-X}$. The PHY device 102 handles data transfer to and from the P2P devices$_{2-X}$. The MAC 104 handles the generation and parsing of frames. The communication control module 106 includes a discovery control module 110 and processes data transmitted to and received from the P2P devices$_{2-X}$.

The power management module 108 controls power distribution from a power supply 109 to the PHY device 102, the MAC 104, and the communication control module 106. The power management module 108 may control when the first P2P device 52 is operating in a sleep mode. The sleep mode may be based on a timing signal (included in bi-directional signals 112) from the discovery control module 110. The timing signal may include start times, durations and/or end times for listen and/or sleep modes. The durations are adjusted to adjust discovery time and power efficiency.

The power management module 108 may deactivate the first P2P device 52 during the sleep mode. During the sleep mode, certain devices or modules may remain powered, for example, for reactivation purposes. For example, the power management module 108 may remain active to determine when to activate (i.e. power) other devices and/or modules of the first P2P device 52 subsequent to a sleep mode. The first P2P device 52 generates beacons, probe response signals and probe request signals when reactivated and operating in the discovery mode.

The discovery control module 110 includes a mode selection module 120, a channel selection module 122 and probe request and response modules 125, 126. The mode selection module selects the operating mode(s) of the first P2P device 52. The modes may include one or more of the modes described above.

The channel selection module 122 selects a channel (i.e., frequency or range of frequencies) on which to transmit a beacon, a probe request signal and/or a probe response signal. The channel selection module 122 may select a channel based on a predetermined or random set of channels, a peer probe request signal, and/or a peer probe response signal. Channel information elements (IEs) 127 and P2P IEs 128 with channel sub-elements 129 may be stored in the memory 140.

The channel IEs 127 identify a current operating channel of the first P2P device 52. The channel IEs 127 may satisfy standards of IEEE 802.11. The channel sub-elements 129 identify a desired channel of the first P2P device 52. The channel sub-elements 129 may not identify a current operating channel of the first P2P device 52.

The channel selection module 122 enables operation of the first P2P device 52 in static and non-static modes. The static mode refers to when the PHY device 102 transmits discover request signals on a single fixed channel. The non-static mode refers to when the PHY device 102 transmits discover request signals on different channels. Transmission on different channels allows for discovery of additional mobile and non-mobile devices. The channels may be randomly selected while operating in the discovery mode, such as during a sleep mode or prior to transmission of beacons or probe request signals.

The channel selection module 122 allows for the first P2P device 52, via the PHY device 102 to transmit beacons or probe request signals on a first channel while receiving beacons, probe request signals, beacon response and/or probe response signals on channels other than the first channel. In one embodiment, the first P2P device 52 may maintain transmission of beacons or probe request signals on a single channel (operate in a static mode) to allow other mobile devices to discover the first PSP device 52. In another embodiment, the first P2P device 52 transmits beacons or probe request signals on different channels (operate in a non-static mode) to discover other mobile devices on multiple channels.

The probe response and request modules 125, 126 generate host probe request and response signals. The host probe response signals may be generated based on peer probe request signals received from peer devices. The peer probe request signals may be generated during the search mode of the first P2P device 52. The host probe response signals may be generated during the listen and/or search modes of the first P2P device 52.

The discovery control module 110 may also include a discovery generator module 130, a user interface module 131, and a device timing module 132. The discovery control module 110 controls discovery operations including the generation, reception and processing of discovery signals. The discovery control module 110 also controls the accessing and storing of discovery information, such as the characteristics and capabilities of a host device (i.e., P2P device$_1$) and of discovered or peer devices (mobile devices$_{2-S}$ and non-mobile devices$_{S-X}$). This information is stored in memory 140 in respective peer files$_{1-P}$, where P is greater than or equal to 2. P may be greater than or equal to S and/or X.

The peer files$_{1-P}$ include device types 150, device names 152, device SSIDs 154, device characteristics 156, device capabilities 158, device discovery times 162, etc. The device types 150 indicate, for example, whether a device is a router, a computer, a printer, a hub, a server, etc. The device names 152 are user recognizable names or names that a user can identify. For example, a SSID is not a user recognizable name, as a SSID is a device specific number. A device name, as used herein, refers to terms or labels, such as "printer", "fax", "contact name", etc. that a user of the first P2P device 52 recognizes and can select upon being discovered. Device characteristics and capabilities 156, 158 may include device channels, frequencies, data rates, packet transmission sizes, etc.

The discovery control module 110 generates timing signals via the discovery generator module 130 while operating in the discovery mode. The discovery generator module 130 generates search mode timing values 168, listen mode timing values 172 and sleep mode timing values 174, such as start times, durations and/or end times of listen and sleep modes.

The device timing module 132 records timestamps of when mobile devices$_{2-S}$ and non-mobile devices$_{S-X}$ are discovered. The timestamps are stored as the discovery times in the peer files$_{1-P}$. The timestamps may include times of day and dates when the mobile devices$_{2-S}$ and non-mobile devices$_{S-X}$ are discovered. This information may be used for mobile and non-mobile device selection and for setting mobile and non-mobile device selecting criterion.

The first P2P device 52 may also include a user interface 192 and a display 194. The discovery control module 110 may select one or more discovered peer device(s) based on a user selection signal from the user interface 192. A user may select one of the discovered peer device(s) that are displayed to the user via the display 294. The user interface 192 may be, for example, a keypad, a touch screen, etc.

Figure 3:
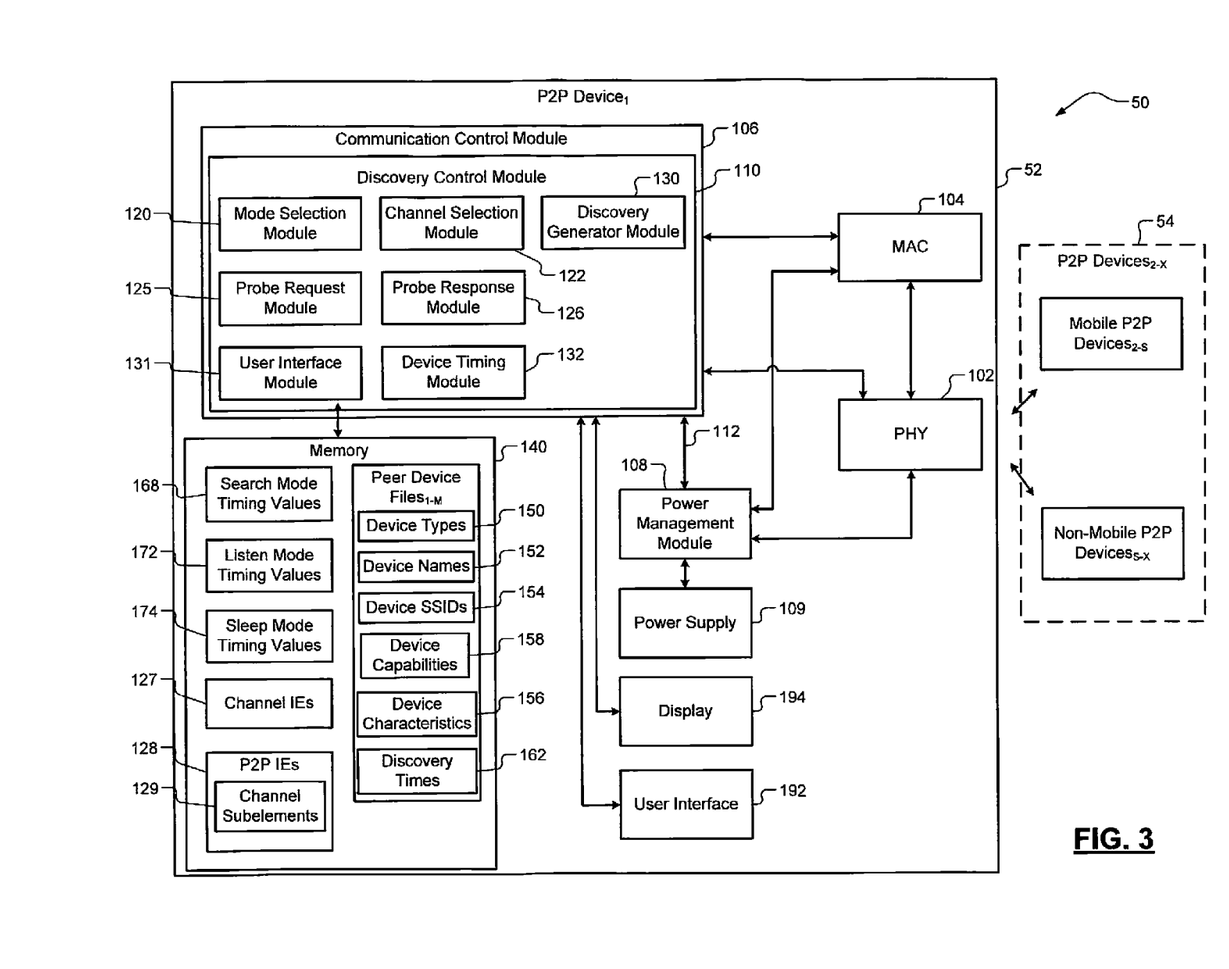
FIG. 3 is a functional block diagram of another portion of the P2P network of FIG. 3.

In FIG. 3, another portion 200 of the P2P network is shown. The portion 200 includes the P2P devices 52, 54. The first P2P device is shown with the PHY 102, the MAC 104, the communication control module 106 and the memory 140. The communication control module 106 includes the discovery control module 110, which in turn includes a peer discovery module 202. The peer discovery module 202 discovers (detects) peer devices based on signals from the mode selection module 120, the channel selection module 122, the probe request module 125, and the probe response module 126.

The communication control module 106 also includes a setup module 204 and a session exchange module 206. The setup module 204 may be used to establish a connection between the first P2P device 52 and one or more of the P2P devices 54. The setup module 204 may be used, for example, during a negotiation mode. The setup module 204 generates a setup completion signal SetupComp when the setup mode is complete. The negotiation mode may be enabled after the discovery mode and include a P2P information exchange via negotiate signals NEGOTIATE between peer devices. The end of the discovery mode is indicated by a discovery completion signal DiscoveryComp generated by the discovery control module. The P2P information may include, for example, channel identifiers (IDs), frequencies, transmit data rates, packet sizes, etc.

The session exchange module 206 may be used when operating in an active session mode. The active session mode may be enabled subsequent to the negotiation mode. The first P2P device 52 may transmit packets of data DATA to and/or receive packets of data DATA from one or more of the P2P devices 54 during the active session mode.

Although the devices and modules of FIGS. 2 and 3 are shown as distinct items, one or more may be implemented as a single item and/or implemented on a single IC. For example, the PHY device 102, the MAC 104, the communication control module 106, the power management module 108, and the memory 140 may be implemented as a single item and/or on a single IC.

Figure 4A:
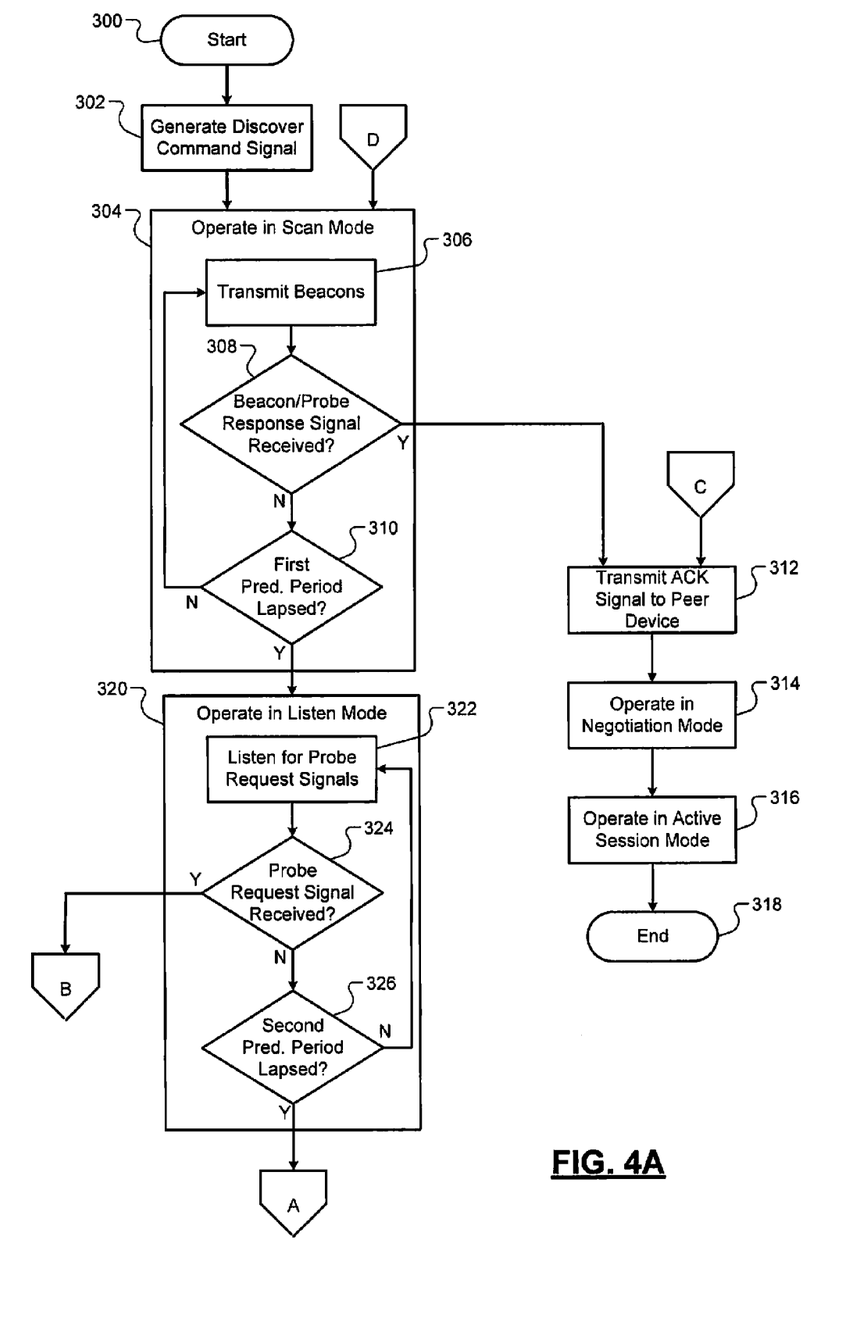
FIGS. 4A and 4B illustrate P2P discovery methods in accordance with the present disclosure.
Figure 4B:
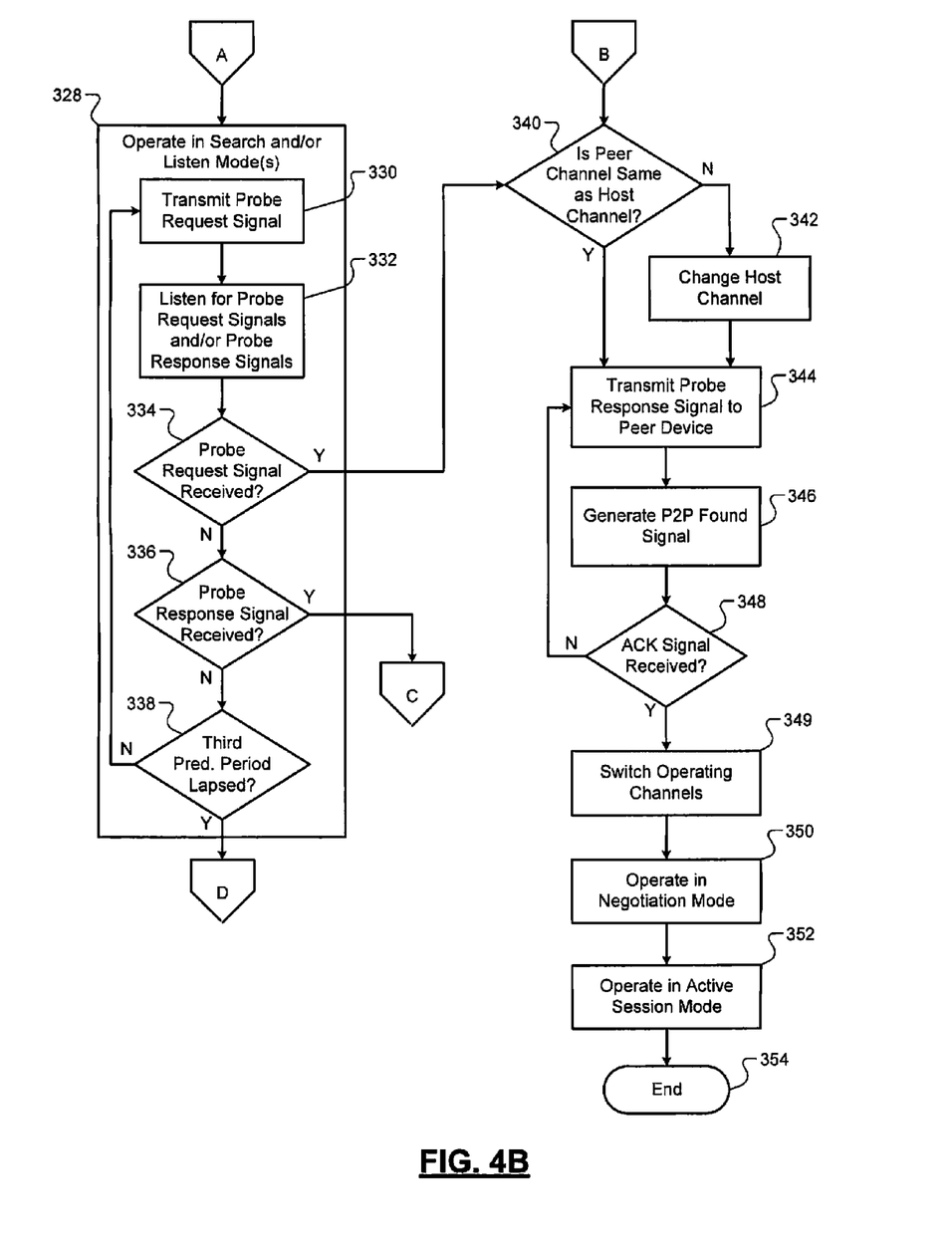
Figure 5:
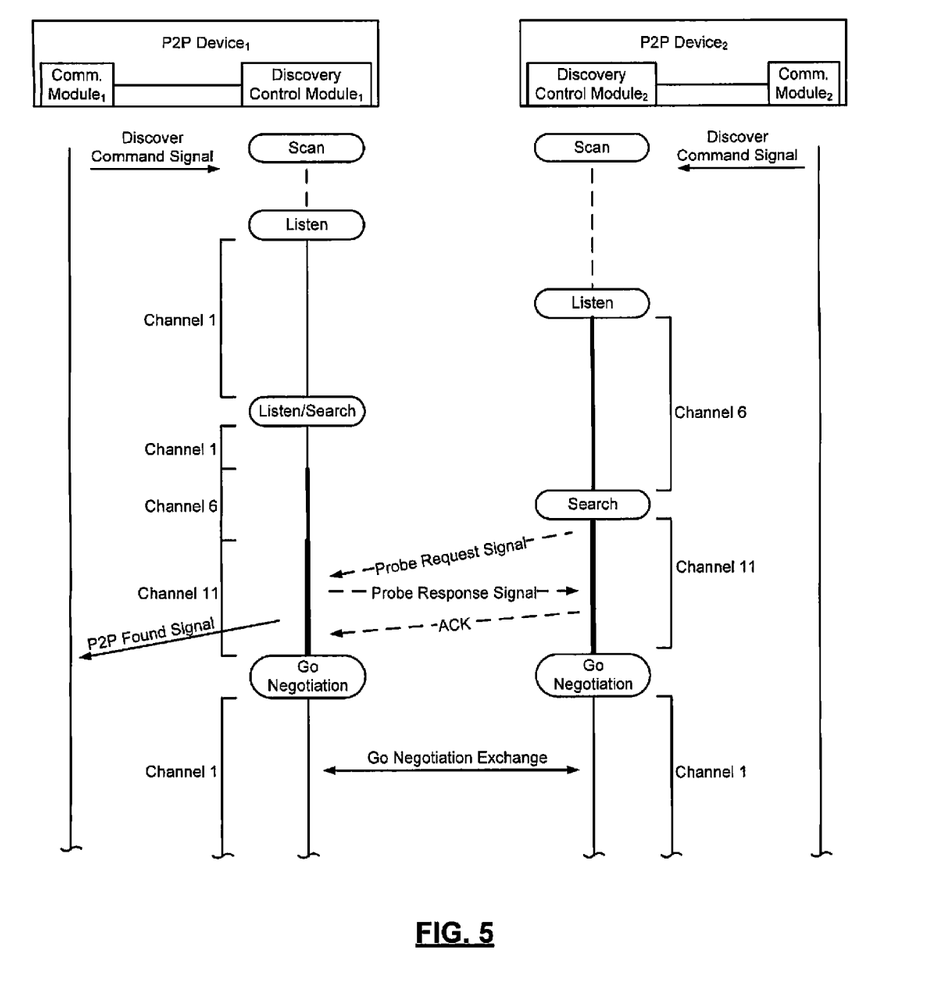
FIG. 5 is a discovery signal diagram illustrating a P2P discovery method when peer devices are operating on the same channels in accordance with the present disclosure.
Figure 6:
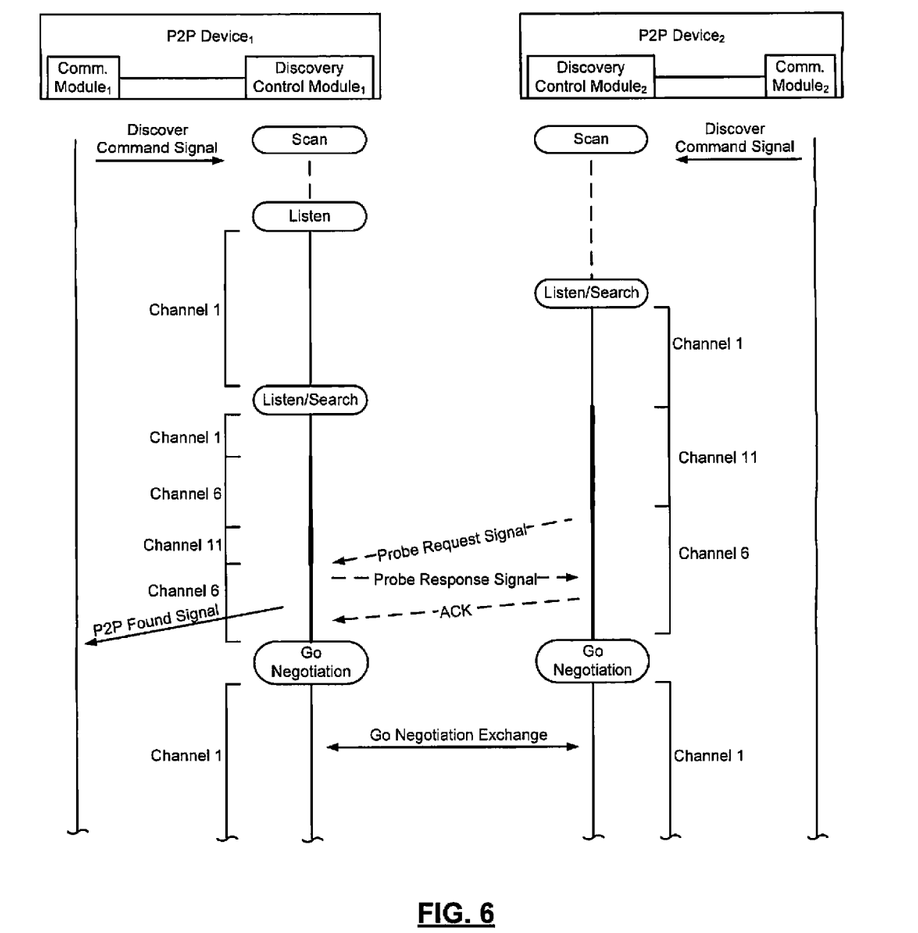
FIG. 6 is a discovery signal diagram illustrating another P2P discovery method when peer devices are not operating on the same channels in accordance with the present disclosure.

The methods of the following FIGS. 4-6 may be implemented by any of the P2P devices shown in FIGS. 1-3. Referring now also to FIGS. 4A and 4B in which a logic flow diagram is shown. Although the following tasks of FIGS. 4A and 4B are described primarily with respect to the embodiments of FIGS. 1-3, the tasks may be applied to other embodiments of the present disclosure. The methods of FIGS. 4A and 4B may be iteratively performed. In the following tasks various signals are generated, some of which are shown in FIG. 3. The methods may begin at 300.

At 302, a discover command signal DISCOVER is generated to initiate the discovery mode, as shown in FIGS. 5 and 6. In FIGS. 5 and 6, a first P2P device$_1$ (host) and a second P2P device$_2$ (peer) are shown. The first P2P device$_1$ may be, for example, the first P2P device 52 and includes a first discovery control module$_1$ (e.g., the discovery control module 110) and a first communication module$_1$. The second P2P device$_2$ may be, for example, one of the P2P devices 54 and includes a second discovery control module$_2$ and a second communication module$_2$. Each of the first and second communication modules$_{1-2}$ may include one or more of a control module, a user interface module, a vendor interface module, an individual or small medium sized enterprise (SME) module, etc. The second P2P device$_2$ may operate similar to the first P2P device$_1$ or may not implement multi-mode operation as described herein.

The discover command signal DISCOVER may be a Wi-Fi protected setup (WPS) provisioning command and may be generated by the discovery control module$_1$. At 304, the discovery control module$_1$ operates in the scan mode based on the discovery command signal. A mode selection module, such as the mode selection module 120, may select the scan mode based on the discovery command signal. The mode selection module indicates the mode by generating a mode signal MODE. The scan mode may be IEEE 802.11 based. At 306, the discovery control module$_1$ generates beacons via a MAC and PHY (e.g., the MAC 104 and the PHY 102). The beacons may be generated at predetermined and/or selected beacon intervals.

At 308, the discovery control module$_1$ listens for beacon response signals (i.e. remains in an idle mode until a beacon response signal is detected). The discovery control module$_1$ proceeds to 310 when a beacon response signal is not detected; otherwise the discovery control module$_1$ proceeds to 312. At 310, the discovery control module$_1$ proceeds to 322 when a first predetermined period has lapsed, otherwise the discovery control module$_1$ returns to 306. The first predetermined period may include a predetermined number of intervals or time units (TUs). The number of TUs may be a randomly generated value.

At 312, the discovery control module$_1$ transmits an acknowledgment (ACK) signal (e.g., ACK$_{Host}$) to a detected peer device based on the received beacon response signal. The ACK signal may include channel information of the first P2P device$_1$. At 314, the first P2P device$_1$ operates in the negotiation mode. At 316, the first P2P device$_1$ operates in an active session mode to allow transfer of data between the first P2P device$_1$ and the detected peer device. The methods may end at 318 as shown or return to step 302.

At 320, the discovery control module$_1$ operates in the listen mode. The mode selection module may select the listen mode based on results of task 310. At 322, the discovery control module$_1$ listens for probe request signals (i.e. remains in an idle mode until a probe request signal is detected). An example probe request signal e.g., REQ$_{Peer}$ is shown in FIG. 3. At 324, the discovery control module$_1$ proceeds to 326 when a probe request signal is not received, otherwise the discovery control module$_1$ proceeds to 340. A peer device is detected when a peer request signal is received, as indicated by a peer detected signal (e.g., PEERDET$_1$), which may be generated by a probe response module.

At 326, the discovery control module$_1$ proceeds to 328 when a second predetermined period has lapsed, otherwise the discovery control module$_1$ returns to 322. The second predetermined period may include a predetermined number of TUs. The number of TUs may be a randomly generated value.

At 328, the discovery control module$_1$ operates in the search and/or listen mode(s). The discovery control module$_1$ may operate in the listen mode while operating in the search mode. The mode selection module may select the search mode based on the results of task 326. At 330, the discovery control module$_1$ transmits probe request signals (e.g., REQ$_{Host}$) via the MAC and the PHY. The probe request signals may include a P2P IE, a WPS IE, a robust secure network (RSN) IE, and a supported regulatory IE. The probe request signals may be transmitted on a different channel or the same channel used during the listen mode, as shown in FIGS. 5 and 6. The first and second P2P devices$_{1-2}$ may switch between channels during the scan, listen, and/or search modes. Examples of different channels are shown in FIGS. 5 and 6.

At 332, the discovery control module$_1$ listens for probe request signals (e.g. REQ$_{peer}$) and/or probe response signals (e.g., RESP$_{Peer}$) from peer devices. The discovery control module$_1$ may remain in an idle mode until a probe request signal and/or a probe response signal is detected.

The first P2P device$_1$ may detect probe request signals and probe response signals transmitted on a different channel than that currently used by the first P2P device$_1$. In a P2P network, P2P devices are typically within a predetermined (close) range (e.g., less than 100 meters) of each other. Signals of the P2P devices are typically strong (e.g., greater than or equal to 15 dB) as due to the close range of operation. Also, the first P2P device$_1$ may not have a channel rejection system that rejects information on channels not currently used by the first P2P device$_1$.

As a result, the first P2P device$_1$ may detect probe request and/or probe response signals transmitted on a different channel (e.g., channel A) than a current operating channel (e.g., channel B) of the first P2P device$_1$. Images of the probe request and probe response signals may be detected on the current operating channel. For the stated reasons, the first P2P device$_1$ may detect probe request and/or probe response signals transmitted by the second P2P device$_2$ regardless of whether the first and second P2P devices$_{1-2}$ are operating on the same channel.

At 334, the discovery control module$_1$ proceeds to 336 when a probe request signal is not received, otherwise the discovery control module$_1$ proceeds to 340. A peer discovery module, such as the peer discovery module 202, may detect the second P2P device$_2$ based on a probe request signal received by the first P2P device$_1$. This may be indicated by a peer detected signal PEERDET$_1$. At 336, the discovery control module$_1$ proceeds to 338 when a probe response signal is not received, otherwise to 312. The peer discovery module may detect the second P2P device$_2$ based on a probe response signal received by the first P2P device$_1$. This may be indicated by a peer detected signal PEERDET$_2$.

The probe response signal may include a first channel IE, a first P2P IE, a WPS IE, a RSN IE, and a supported regulatory class IE. The first channel IE identifies a current operating channel of the second P2P device$_2$. The first channel IE may satisfy standards of IEEE 802.11. The first P2P IE may include a first channel sub-element. The first channel sub-element identifies a desired channel of the second P2P device$_2$. The channel sub-element may not identify a current operating channel of the second P2P device$_2$. The first channel IE and the P2P IE may be stored in memory (e.g., memory 140).

At 338, the discovery control module$_1$ returns to 304 when a third predetermined period has lapsed, otherwise to 330. As an alternative the methods may end when the third predetermined period has lapsed. The third predetermined period may include a predetermined number of TUs. The number of TUs may be a randomly generated value.

At 340, a channel selection module, such as the channel selection module 122, may determine whether a current operating channel of the first P2P device$_1$ (host channel) is the same as the current operating channel of the second P2P device$_2$ (peer channel). The channel selection module may generate a channel ID signal Chan$_{Host}$ to indicate the operating channel of the Host. The discovery control module$_1$ proceeds to 342 when the host channel is different than the peer channel; otherwise the discovery control module$_1$ proceeds to 344.

At 342, the first P2P device$_1$ switches from the host channel to the peer channel (e.g., from channel 11 to channel 6) based on the probe request signal from the second P2P device$_2$. At 344, the first P2P device$_1$ transmits a probe response signal (e.g., RESP$_{Host}$) to the second P2P device$_2$ based on the received probe request signal. The probe response signal may include a second channel IE, a second P2P IE, a WPS IE, a RSN IE, and a supported regulatory class IE. The second channel IE identifies an operating channel that the first P2P device$_1$ is to operate on during, for example, negotiation and active session modes. The second channel IE may satisfy standards of IEEE 802.11. The second channel IE serves as a channel request. The first P2P device$_1$ requests that the second P2P device$_2$ switch to the operating channel via the channel request.

The second P2P IE may include a second channel sub-element. The second channel sub-element identifies a desired channel of the first P2P device$_1$. The second channel sub-element may not identify a current operating channel of the first P2P device$_1$.

At 346, the first P2P device$_1$ generates a P2P found signal (e.g., P2PFOUND) indicating that the second P2P device$_2$ is detected. The P2P found signal may be generated based on one of the peer detected signals PEERDET$_1$, PEERDET$_2$ and transmitted to the first communication module$_1$. At 348, the first discovery control module$_1$ proceeds to 349 when an ACK signal (e.g., ACK$_{Peer}$) is received from the second P2P device$_2$. The second P2P device$_2$ transmits an ACK signal to the first P2P device$_1$ in response to the probe response signal. The ACK signal is transmitted on the same channel as the probe response signal (i.e. the peer channel). The first discovery control module$_1$ may end, return to 304, or return to 344 as shown when an ACK signal is not received.

At 349, the first and second P2P devices$_{1-2}$ may switch operating channels from the peer channel to the channel requested by the first P2P device$_1$. The first and second P2P devices$_{1-2}$ may switch to a channel first used when the discovery mode was initiated and/or used during the scan and/or listen modes (e.g., channel 1 in FIGS. 5 and 6). The first P2P device$_1$ may wait for packets from the second P2P device$_2$ for a predetermined period after switching operating channels.

At 350, the first and second P2P devices$_{1-2}$ operate in the negotiation mode to setup a connection between the first and second P2P devices$_{1-2}$. At 352, the first and second P2P devices$_{1-2}$ operate in the active session mode to allow transfer of data packets between the first and second P2P devices$_{1-2}$. The methods end at 354.

The above-described tasks of FIGS. 4A and 4B are meant to be illustrative examples; the tasks may be performed sequentially, synchronously, simultaneously, continuously, during overlapping time periods or in a different order depending upon the application.

For example, tasks 330 and 332 may be performed during the same period of time. As another example, tasks 332-334 may be performed before task 330.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A discovery control system configured to be implemented in a first device, wherein the first device is configured to operate in a wireless network, the discovery control system comprising:

a mode selection module configured to select a mode of operation for the first device, wherein the mode of operation includes (i) a listen mode, (ii) a search mode or (iii) a multi-mode, and wherein the first device, while operating in the multi-mode, operates in both the listen mode and the search mode during a same period of time; and a discovery control module comprising a probe request module configured to, while the first device is operating in the search mode, (i) transmit, from the first device, a first probe request signal to discover a second device in the wireless network, and (ii) receive, responsive to the first probe request signal transmitted from the first device, a first probe response signal transmitted by the second device, and a probe response module configured to, while the first device is operating in the multi-mode and is in asynchronous communication with the second device, (i)

receive a second probe request signal, transmitted from the second device on a first channel, to discover the first device, and (ii) transmit a second probe response signal from the first device on a second channel, wherein the second probe response signal transmitted from the first device is responsive to the second probe request signal transmitted from the second device.

2. The discovery control system of claim 1, further comprising a channel selection module configured to select, based on the second probe request signal transmitted from the second device, the second channel for the first device to transmit the second probe response signal responsive to the second probe request signal transmitted from the second device.

3. The discovery control system of claim 2, further comprising a physical layer device, wherein:
the channel selection module is configured to, based on the second probe request signal transmitted from the second device, select the second channel for the first device while the first device is operating in the listen mode or the search mode; and
the physical layer device is configured to transmit, on the second channel selected by the channel selection module, the second probe response signal transmitted from the first device responsive to the second probe request signal transmitted from the second device.

4. The discovery control system of claim 3, wherein:
the second probe response signal transmitted from the first device responsive to the second probe request signal transmitted from the second device comprises a peer-to-peer information element or a channel information element;
the peer-to-peer information element or the channel information element identifies a third channel; and
the second probe request signal transmitted from the second device indicates the second channel.

5. The discovery control system of claim 3, wherein:
the probe response module generates the second probe response signal transmitted from the first device to include (i) a channel information element, and (ii) a peer-to-peer information element with a channel sub-element;
the peer-to-peer information element identifies a third channel;
the third channel is different than the second channel; and
the channel sub-element identifies the first channel of the second probe request signal transmitted from the second device.

6. The discovery control system of claim 3, wherein the channel selection module is configured to select a channel based on the first probe response signal transmitted from the second device.

7. The discovery control system of claim 1, further comprising a setup module or a session exchange module, wherein:
based on a discovery complete signal, the setup module or the session exchange module is configured to communicate with the second device via a physical layer device;
the mode selection module is configured to generate the discovery complete signal based on the second probe request signal transmitted from the second device; and
the second probe request signal transmitted from the second device is received by the first device during the multi-mode.

8. The discovery control system of claim 1, further comprising a physical layer device configured to receive the second probe request signal transmitted from the second device on the first channel while operating in the multi-mode wherein:
the physical layer device is configured to transmit the second probe request signal transmitted from the second device during the multi-mode on the second channel; and
the second channel is different than the first channel.

9. The discovery control system of claim 1, further comprising a channel selection module configured to (i) select a channel of the listen mode or the search mode based on the second probe request signal transmitted from the second device, and, (ii) based on an acknowledgement signal generated by the second device, switch from a current channel to the channel of the listen mode or the search mode.

10. The discovery control system of claim 9, wherein the channel selection module is configured to receive the acknowledgement signal subsequent to generation of the first probe response signal transmitted from the second device.

11. The discovery control system of claim 10, further comprising a physical layer device configured to receive the acknowledgement signal on the current channel, the channel of the listen mode, or a peer channel,
wherein the peer channel is different than the current channel and the channel of the listen mode.

12. The first device of claim 1, comprising:
the discovery control system; and
a physical layer device configured to wirelessly transmit the second probe response signal transmitted from the first device to the second device.

13. A peer-to-peer network comprising:
the first device of claim 12; and
the second device comprising
a channel selection module configured to select a channel based on the second probe response signal generated by the probe response module, and
a physical layer device configured to communicate with the first device on the channel subsequent to receiving the first probe request signal generated by the probe request module.

14. The peer-to-peer network of claim 13, wherein:
the channel is a listen mode channel of the first device;
the second device further comprises a probe request module configured to generate the second probe request signal transmitted from the second device;
the probe request module of the second device is configured to generate an acknowledgement signal based on the second probe response signal transmitted from the first device; and
the first device is configured to switch from a current channel to the listen mode channel based on the acknowledgement signal.

15. The discovery control system of claim 5, wherein:
the probe response module is configured to receive an acknowledgement signal from the second device in response to the second probe request signal transmitted from the second device;
the acknowledgement signal is received from the second device on the first channel of the second probe request signal transmitted from the second device; and
the channel selection module is configured to, based on the acknowledgement signal, switch from the first channel of the second probe request signal transmitted from the second device to the second channel.

16. The discovery control system of claim 15, further comprising a setup module configured to operate in a negotiation mode to setup a connection between the first device and the second device, wherein:
the discovery control module is configured to signal to the setup module an end of a discovery mode in response to the acknowledgement signal; and
the setup module is configured to communicate with the second device on the second channel to setup the connection between the first device and the second device.

17. The discovery control system of claim 1, wherein the probe request module is configured to, while the first device is operating in the multi-mode and is in asynchronous communication with the second device, (i) transmit, from the first device and on the second channel, the first probe request signal to discover the second device in the wireless network, and (ii) receive, responsive to the first probe request signal transmitted from the first device, the first probe response signal transmitted by the second device on the first channel or the second channel.

18. The discovery control system of claim 1, wherein the probe request module is configured to transmit the first probe request signal while the probe response module receives the second probe request signal.

19. The discovery control system of claim 1, wherein the probe request module is configured to transmit the first probe request signal while the probe response module receives the second probe request signal or transmits the second probe response signal.

20. The discovery control system of claim 1, wherein the probe request module is configured to receive the first probe response signal while the probe response module receives the second probe request signal or transmits the second probe response signal.

21. A discovery control system configured to be implemented in a first device, wherein the first device is configured to operate in a wireless network, the discovery control system comprising:
a mode selection module configured to select a mode of operation for the first device, wherein the mode of operation includes (i) a listen mode, (ii) a search mode or (iii) a multi-mode, and
wherein the first device, while operating in the multi-mode, operates in both the listen mode and the search mode during a same period of time; and
a discovery control module comprising
a probe request module configured to, while the first device is operating in the multi-mode and is in asynchronous communication with a second device, (i) transmit, from the first device and on a first channel, a first probe request signal to discover the second device in the wireless network, and (ii) receive, responsive to the first probe request signal transmitted from the first device, a first probe response signal transmitted by the second device on a second channel, and
a probe response module configured to, while the first device is operating in the multi-mode and is in asynchronous communication with the second device, (i) receive a second probe request signal, transmitted from the second device, to discover the first device, and (ii) transmit a second probe response signal from the first device, wherein the second probe response signal transmitted from the first device is responsive to the second probe request signal transmitted from the second device.

22. The discovery control system of claim 21, wherein the probe response module is configured to, while the first device is operating in the multi-mode and is in asynchronous communication with the second device, (i) receive the second probe request signal, transmitted from the second device on the second channel, to discover the first device, and (ii) transmit the second probe response signal from the first device on the first channel or the second channel.

23. The discovery control system of claim 21, wherein the probe request module is configured to transmit the first probe request signal while the probe response module receives the second probe request signal.

24. The discovery control system of claim 21, wherein the probe request module is configured to transmit the first probe request signal while the probe response module receives the second probe request signal.

25. The discovery control system of claim 21, wherein the probe request module is configured to transmit the first probe request signal while the probe response module receives the second probe request signal or transmits the second probe response signal.

* * * * *